United States Patent
Perkins

(10) Patent No.: US 6,208,056 B1
(45) Date of Patent: *Mar. 27, 2001

(54) CARTRIDGE ARMATURES FOR ELECTRO-DYNAMIC MACHINES

(75) Inventor: David E. Perkins, Austin, TX (US)

(73) Assignee: Active Power, Inc., Austin, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/925,937

(22) Filed: Sep. 8, 1997

(51) Int. Cl.[7] .............................. H02K 3/00; H02K 3/04; H02K 3/32
(52) U.S. Cl. ................................. 310/179; 310/43; 310/71
(58) Field of Search ...................... 310/179, 184, 310/194, 208, 43, 71, 260, 214

(56) References Cited

U.S. PATENT DOCUMENTS

| | | | |
|---|---|---|---|
| 1,743,860 | * | 1/1930 | Meunier .................................. 310/71 |
| 3,082,337 | | 3/1963 | Horsley .................................. 310/179 |
| 3,097,319 | | 7/1963 | Henry-Baudot ....................... 310/179 |
| 3,123,729 | * | 3/1964 | Fagel ........................................ 310/43 |
| 3,145,317 | * | 8/1964 | Blohn ...................................... 310/71 |
| 3,529,192 | | 9/1970 | Davies .................................. 310/179 |
| 3,538,364 | | 11/1970 | Favereau ............................... 310/158 |
| 3,725,708 | | 4/1973 | Possis ..................................... 310/179 |
| 4,068,142 | | 1/1978 | Gillet et al. ........................... 310/214 |
| 4,173,724 | | 11/1979 | von Musil .............................. 310/258 |
| 4,228,375 | | 10/1980 | Beermann et al. ................... 310/214 |
| 4,281,264 | | 7/1981 | Keim et al. ............................ 310/194 |
| 4,321,494 | | 3/1982 | MacNab ................................. 310/179 |
| 4,330,726 | | 5/1982 | Abright et al. ....................... 310/254 |
| 4,345,175 | | 8/1982 | Jones ....................................... 310/45 |
| 4,562,164 | * | 12/1985 | Miyazaki et al. ...................... 501/151 |
| 4,679,313 | * | 7/1987 | Schultz et al. .......................... 29/596 |
| 4,837,921 | * | 6/1989 | Tassinario .............................. 29/596 |
| 5,053,663 | | 10/1991 | Böer et al. ............................... 310/91 |
| 5,731,645 | | 3/1998 | Clifton et al. .......................... 310/74 |
| 5,744,896 | * | 4/1998 | Kessinger, Jr. et al. ............. 310/268 |
| 5,828,147 | * | 10/1998 | Best et al. ............................... 310/71 |

FOREIGN PATENT DOCUMENTS

| | | |
|---|---|---|
| 40 30 711 | 4/1992 | (DE) . |
| 0 313 514 A1 | 4/1989 | (EP) . |
| 837546 | 6/1960 | (GB) .................................. 310/179 |
| 881468 | 11/1961 | (GB) .................................. 310/179 |
| 1247344 | 9/1971 | (GB) .................................. 310/179 |
| WO 97/28596 | 8/1997 | (WO) . |

* cited by examiner

Primary Examiner—Karl Tamai
(74) Attorney, Agent, or Firm—Fish & Neave; Robert W. Morris; Edward M. Arons

(57) ABSTRACT

A field replaceable air-gap cartridge armature device for use in rotating electric machines is presented. The cartridge armature includes a plurality of bent-shaped air-gap windings rigidly arranged in a circular fashion to form an inner rim, an outer rim and an active section. The inner and outer rims are formed by end turn sections that are bent toward and away, respectively, from the center of the cartridge device. The windings may be generally arranged into a Z-shaped cross-section that is embedded in a fiber reinforced epoxy resin matrix to provide a rigid structure for transferring torque from the air-gap windings to a stator. Countersunk fasteners are used to easily attach and remove the cartridge armature from a rotating electric machine. The cartridge armature can be configured as a three phase, Y-connected armature circuit, and provides electrically insulated, substantially vacuum tight terminal penetration of a rotating electric machine for electrical feed-throughs.

14 Claims, 13 Drawing Sheets

CARTRIDGE ARMATURES FOR ELECTRO-DYNAMIC MACHINES

BACKGROUND OF THE INVENTION

This invention relates to armature windings for direct and alternating current electric machines. More particularly, this invention relates to the use, configuration, and manufacturing process for improved smooth air-gap armature windings.

Rotating electric machines convert mechanical energy into electrical energy (e.g., an electric generator) and electrical energy into mechanical energy (e.g., an electric motor) by moving a magnetic field with respect to an electric circuit. The magnetic field is produced by electrons in motion, and the electric circuit is typically a set of electrical conductor windings or coils.

Rotating electric machines have two basic components, a rotor and a stator. The rotor is usually the moving part that contains electrical conductors for producing a magnetic field. The stator is usually the stationary part that contains an electric circuit (e.g., armature windings) for also producing a magnetic field that interacts with the magnetic field produced by the rotor. The interaction between the moving and stationary magnetic fields produces torque (i.e., a twisting force) in a motor or voltage in a generator.

FIG. 1A is a simplified diagram illustrating a rotating electric machine with a slot wound armature geometry. A primary magnetic field is developed on rotor 101a that rotates relative to fixed windings 102a on stator 103a. Often, the windings are wound on iron cores to maximize magnetic flux between the rotor and stator. Magnetic flux is analogous to current and can be thought of as the lines of force of a magnetic field. When currents flow in the stator windings, electromechanical torque develops as a result of the interaction of the rotor and stator magnetic fields. By installing the stator windings in slots 104, the resultant torque is generated between the stronger iron core materials of stator 103a rather than on the lower strength conductors of windings 102a.

Alternatively, the armature conductors may be arranged on a smooth bore stator as shown in FIG. 1B. The terms "smooth bore windings" or "air-gap windings" are often used to describe this geometry. An advantage of this geometry is the elimination of azimuthal variation in the iron circuit. In other words, the total flux in the air gap between the rotor and the stator does not change as a function of rotor angular position. This advantage is particularly important in high speed, multi-pole machines that operate at high electrical frequency, because these variations in total flux contribute to rotor and stator heating through the development of eddy currents. Heating can damage the windings and other components.

The standard method of minimizing eddy currents is to laminate the iron core components (most often the stator is laminated). Lamination thickness is a function of operating frequency. However, as the frequency of operation increases to several hundred hertz and beyond, the required lamination thickness becomes extremely thin and thus difficult to assemble into bulk components. Moreover, the laminations must be insulated from one another and the finite thickness of the non-ferrous insulation reduces the effective cross section of iron, which ultimately decreases a given machine's peak power output due to field saturation.

Applications particularly well suited to air-gap windings are machines requiring high power output. By placing the conductors in the air gap, some of the iron (e.g., teeth 105) from the armature circuit is eliminated, reducing the armature circuit inductance and thus the reactive impedance. Thus, for a given machine voltage, maximum power output may be obtained. However, unlike slot wound stator windings, the air-gap windings transfer torque through the lower strength conductors themselves. To facilitate transfer of torque loads from the conductors to the stronger iron core stator, several machines have been built where the conductors are bonded to the smooth bore of the stator using adhesives. The strength of this bond is a function of surface cleanliness and other factors that are difficult to control prior to assembly and difficult to inspect in service.

Machines such as the flywheel motor-generator described in U.S. patent application Ser. No. 08/597,008, which is assigned to Active Power, Inc. of Austin, Tex., operate in a vacuum to reduce rotor windage losses (i.e., energy losses caused by air drag). However, several complications result from this environment. First, the armature conductors must penetrate the stator that provides the vacuum enclosure. These penetrations must be vacuum tight to minimize the size of the vacuum pump. Furthermore, conductors or conductor connections exposed to the vacuum environment should be insulated to reduce the risk of corona discharge (i.e., electrical discharge through an ionized gas). The likelihood of a corona discharge depends on the pressure and composition of residual gases within the vacuum. A vacuum environment also requires that heat transfer from the windings to the stator be by radiation or conduction; the latter advantageously resulting in a lower temperature rise within the armature, which increases service life.

Finally, loss of armature dielectric integrity because of mechanical damage, heating damage, and other causes of internal shorting requires that the armature be replaced. With either slot wound armatures or bonded air-gap windings, the entire rotating electric machine must be sent to a service facility to machine-out the old windings and either rewind or bond-in new windings. The labor costs of this process are so significant that many smaller machines are discarded and replaced.

In view of the foregoing, it would be desirable to provide an improved armature winding for rotating electric machines that can be easily and economically serviced in the field.

It would also be desirable to provide an improved armature winding that provides a low inductance air-gap winding to increase machine power density.

It would further be desirable to provide an improved armature winding that transfers torque to a stator during high power operation.

It would still further be desirable to provide an improved armature winding that provides conduction heat transfer from the armature conductors to a stator.

It would yet further be desirable to provide an improved armature winding that provides electrically insulated, vacuum tight penetrations of a stator for electrical feedthroughs.

It would also be desirable to provide an improved armature winding that provides armature conductor isolation in vacuum environments to reduce the risk of corona discharge.

It would further be desirable to provide an improved armature winding that provides compact coil connections to reduce the volume of the armature winding.

Finally, it would be desirable to provide an improved armature winding that provides coil-to-coil electrical isolation.

SUMMARY OF THE INVENTION

It is an object of this invention to provide an improved armature winding for rotating electric machines that can be easily and economically serviced in the field.

It is also an object of this invention to provide an improved armature winding that provides a low inductance air-gap winding to increase machine power density.

It is a further object of this invention to provide an improved armature winding that transfers torque to a stator during high power operation.

It is a still further object of this invention to provide an improved armature winding that provides conduction heat transfer from the armature conductors to a stator.

It is yet a further object of this invention to provide an improved armature winding that provides electrically insulated, vacuum tight penetrations of a stator for electrical feed-throughs.

It is also an object of this invention to provide an improved armature winding that provides armature conductor isolation in vacuum environments to reduce the risk of corona discharge.

It is a further object of this invention to provide an improved armature winding that provides compact coil connections to reduce the volume of the armature winding.

Finally, it is an object of this invention to provide an improved armature winding that provides coil-to-coil electrical isolation.

In accordance with this invention, there is provided a cartridge armature device for use in a rotating electric machine. The cartridge armature includes a plurality of air-gap Z-coil windings rigidly configured in a circular fashion. A plurality of output terminals coupled to the Z-coil windings is also included. The cartridge armature is removably attachable to a rotating electric machine to enhance field serviceability of the machine.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1B:
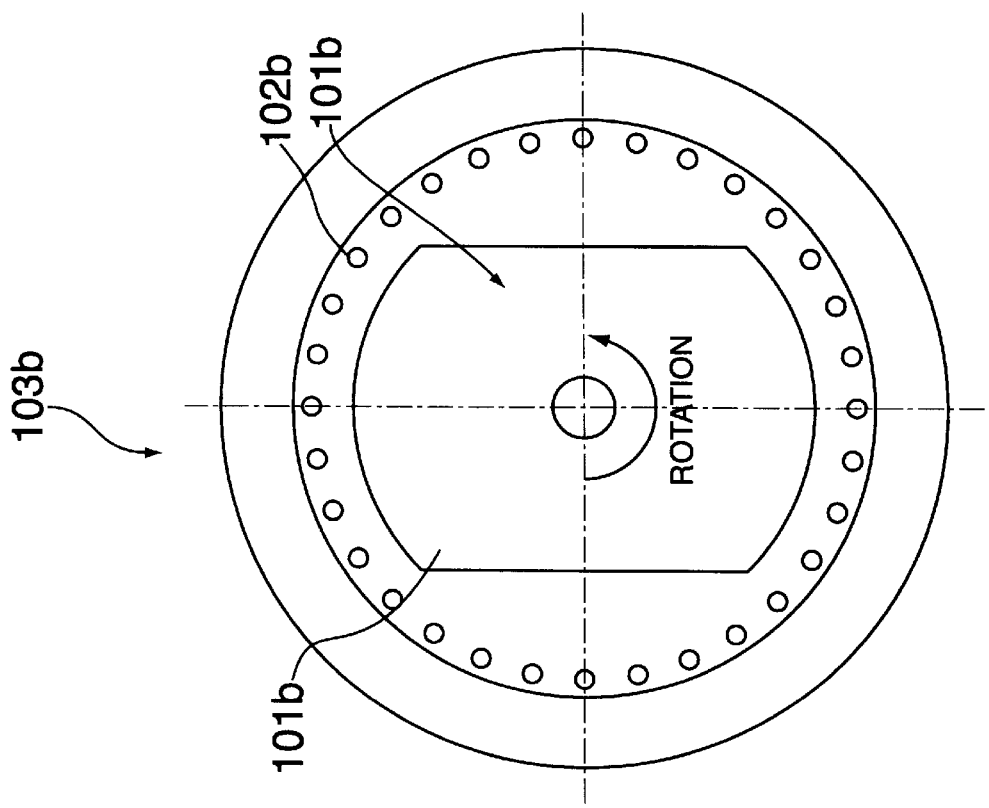
FIG. 1B is a simplified diagram of a rotating electric machine with a smooth air-gap armature geometry.
Figure 1A:
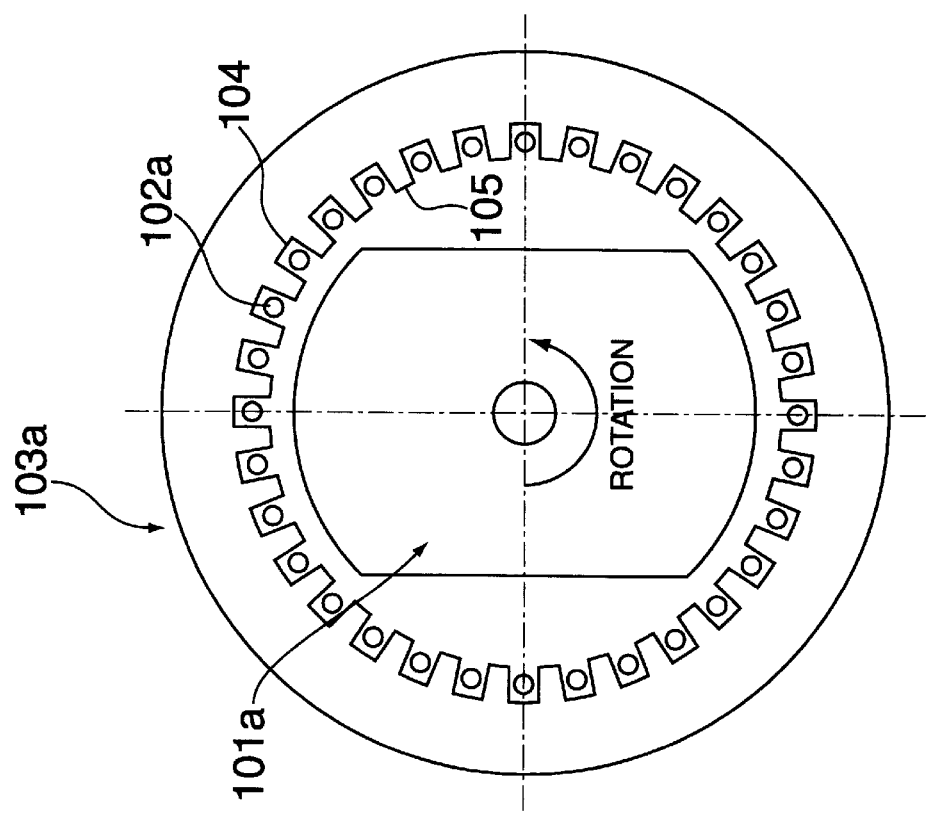
FIG. 1A is a simplified diagram of a rotating electric machine with a slot wound armature geometry.
Figure 2:
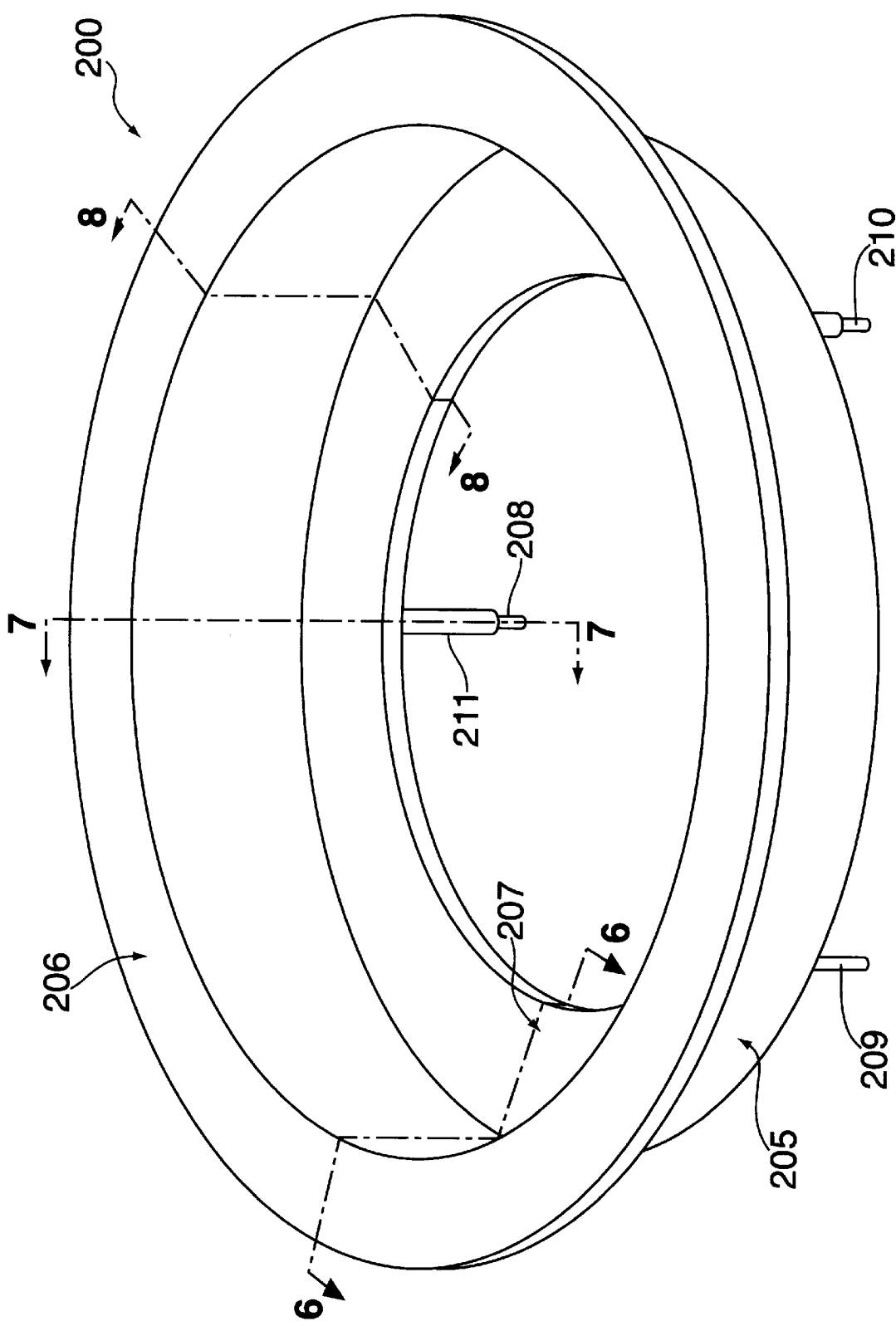
FIG. 2 is a perspective view of an exemplary embodiment of a cartridge armature device according to the present invention.

The present invention provides a field replaceable cartridge armature device having smooth air-gap armature windings for use in homopolar and heteropolar rotating electric machines, such as, for example, high power flywheel energy storage devices. Flywheel energy storage devices typically provide high power by high frequency rotation of a flywheel rotor. Homopolar machines are those that have like magnetic poles (e.g., north poles) located on the rotor. Thus the polarity of the magnetic flux remains constant during rotation of the rotor. In contrast, heteropolar machines have both poles (e.g., north and south) located on the rotor, thus the polarity of the magnetic flux varies between positive and negative during rotation of the rotor. A preferred embodiment of a cartridge armature device constructed in accordance with the principles of the present invention is illustrated in FIG. 2.

Figure 3:
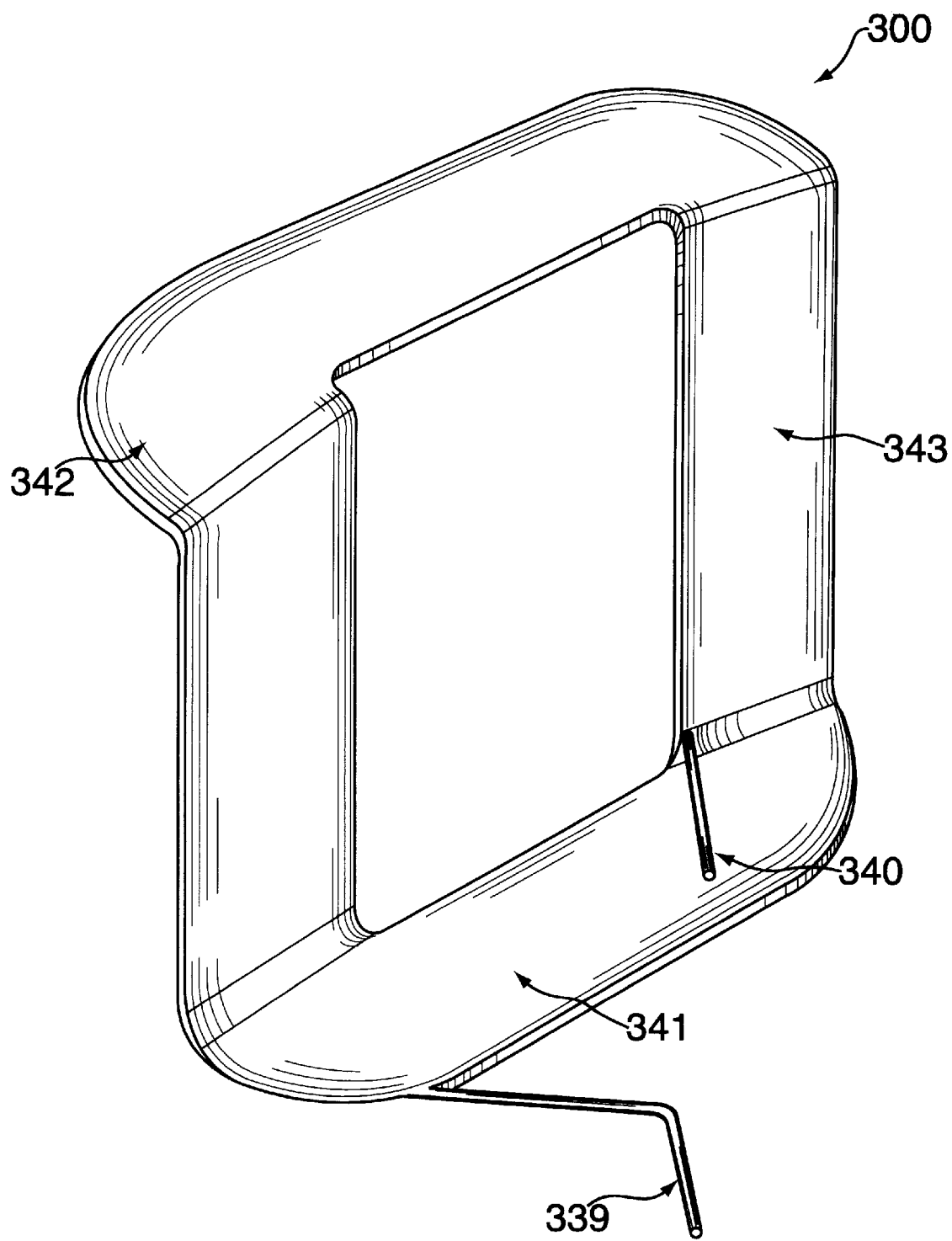
FIG. 3 is a perspective view of an exemplary embodiment of a single Z-coil winding according to the present invention.

Cartridge armature device 200 includes a plurality of preferably Z-coil windings, described more fully in U.S. patent application Ser. No. 08/597,008, which is incorporated herein by reference. A single Z-coil conductor winding 300 is shown in FIG. 3. Unlike slot wound armature windings, air-gap Z-coil windings are not wound around an iron core. The Z-coil windings of cartridge 200 are configured in a circular fashion and are embedded in a fiber reinforced resin matrix that provides a rigid structure for transferring torque from the Z-coil windings to the stator.

While the present invention is described with respect to Z-coils, persons skilled in the art will appreciate that the specific shape of the air-gap coils may be varied without departing from the scope of the present invention. The cartridge armature includes a plurality of bent-shaped air-gap coils rigidly arranged in a circular fashion to form an inner rim, an outer rim and an active section. The inner and outer rims are formed by end turn sections that are bent toward and away, respectively, from the center of the cartridge device. The end turn sections may be bent such that they are parallel to each other and/or they may be bent such that they are perpendicular to the active members, as is described in detail below.

Cartridge 200 accordingly has a bent-shaped (or Z-shaped) cross-section. Active lengths 343 of the air-gap windings (or Z-coils) are embedded in active section 205 of cartridge 200, while air-gap outer end turns 342 are embedded in outer rim 206. Embedded in inner rim 207 are air-gap inner end turns 341 and coil terminations 339 and 340. As can be seen from FIG. 2, active section 205 is between outer and inner rims 206 and 207. Outer rim 206 has an inner diameter that is substantially equal to the diameter of active section 205 and an outer diameter that is larger than the diameter of section 205. Inner rim 207 has an outer diameter that is substantially equal to the diameter of section 205 and an inner diameter that is smaller than the diameter of section 205. Outer end turns 342 and inner end turns 341 may be bent such that they are parallel to each other. They may also be bent such that they are perpendicular to active lengths 343 (or they may be bent at different angles from each other).

Figure 4:
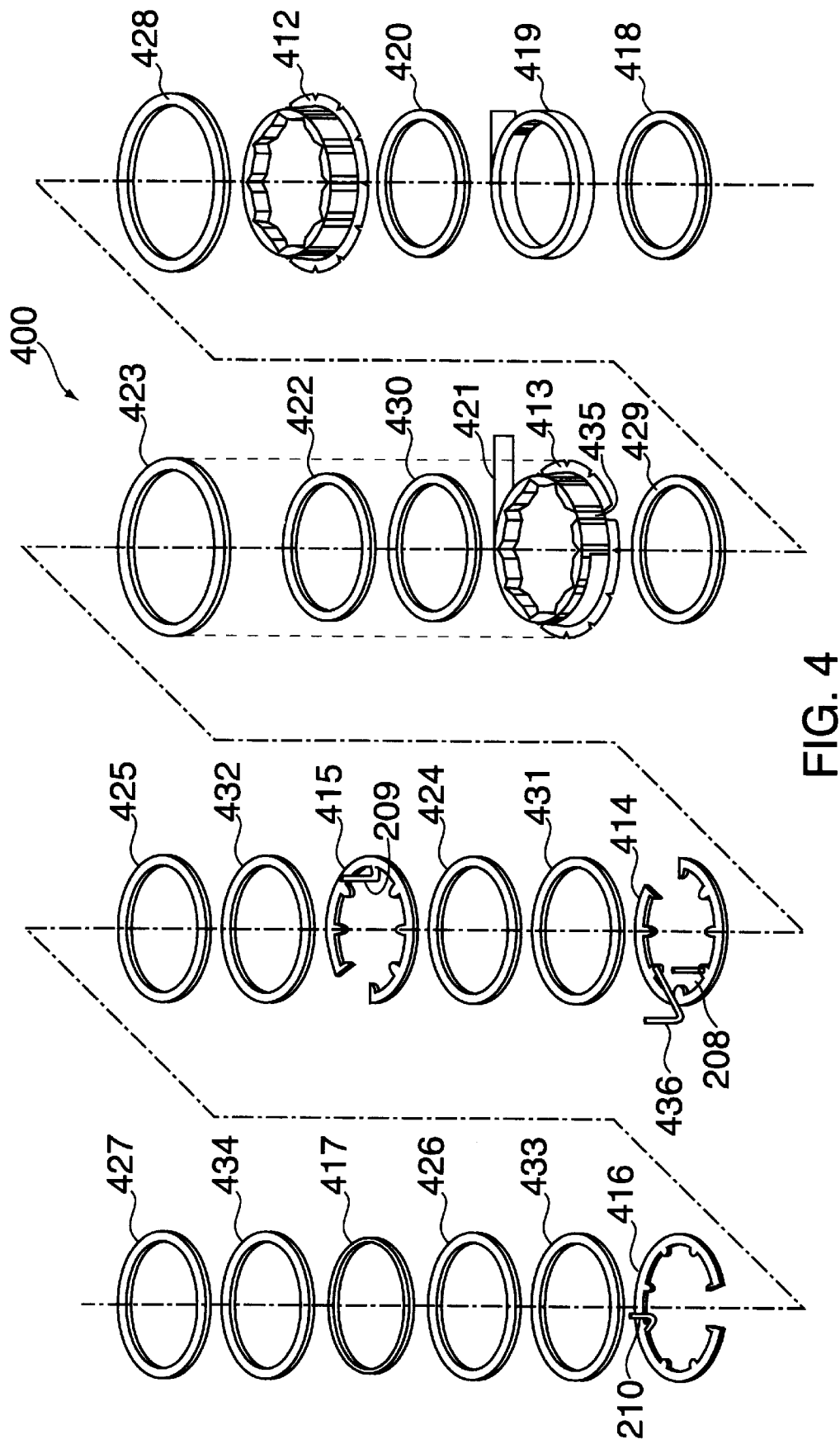
FIG. 4 is an exploded view of an exemplary embodiment of a three-phase cartridge armature according to the present invention.
Figure 5:
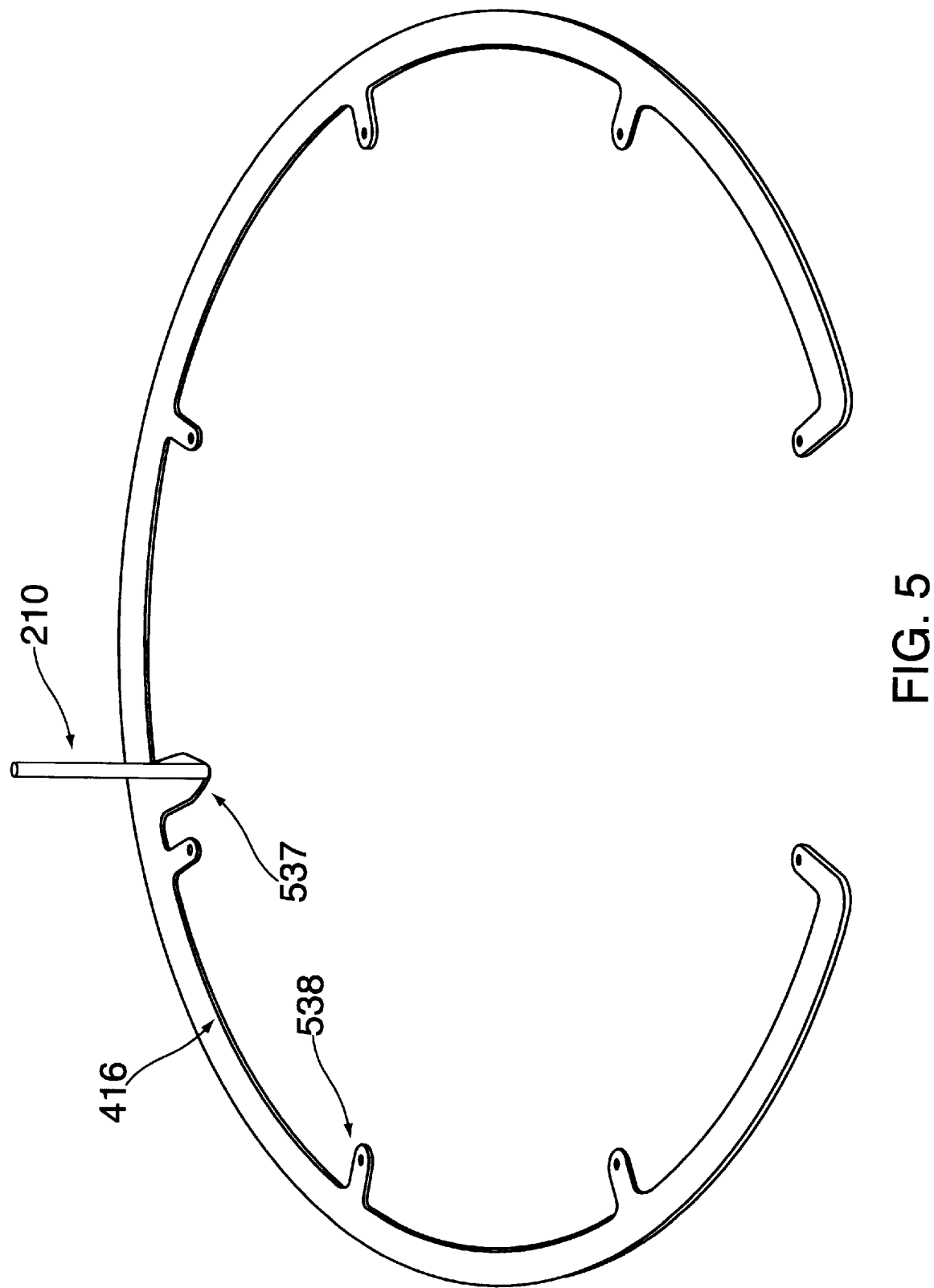
FIG. 5 is a perspective view of an exemplary embodiment of an armature phase-bus connector according to the present invention.

Also embedded in rim 207 are phase-bus connectors 414, 415, and 416 (shown in FIGS. 4 and 5). Phase-bus connectors 414, 415, and 416 distribute electric current from the air-gap windings to the respective output phase terminals 208, 209, and 210. Each output phase terminal has ground-plane insulation provided by an insulating tube 436 (FIG. 4), which is embedded in a continuous extension of fiber reinforced resin matrix 211 to allow for substantially vacuum tight penetration of a rotating electric machine housing. Although phase-bus connectors 414, 415 and 416 are shown to be embedded in inner rim 207 in the figures, these connectors could also be embedded in outer rim 206 without departing from the scope of the present invention. In that case, output phase terminals 208, 209 and 210 would be attached to outer rim 206 instead of inner rim 207.

FIG. 4 is an exploded view of an exemplary embodiment of the internal components and assemblies of cartridge 200 configured in accordance with the present invention. Cartridge 200 is a three-phase, Y-connected armature circuit that can be used with a homopolar field rotor having eight salient poles. In such a homopolar field rotor, flux exits the rotor surface radially and enters axially. Cartridge 200 and this homopolar rotor produce eight complete voltage cycles for every cycle of rotor revolution. Those skilled in the art recognize that other rotor pole geometry and armature winding and connection schemes are possible that allow other combinations of numbers of phases and poles to change the output characteristics of the machine. For example, parallel connectivity (as shown) provides the lowest voltage but maximizes current, while series connectivity provides higher voltages and reduced currents. A delta connection is also possible with other phase bus designs.

Cartridge 200 gains structural integrity by first using layers of dry fiber reinforcement distributed throughout the structure. Glass or Kevlar® fibers in the form of roving, random fiber cloth, woven cloth, or engineered fabrics may be used. Graphite fiber may also be used if separated from the conductors with suitable insulation. Insulation is necessary because of the electrically conductive nature of graphite fiber.

After assembly of the components on a mold form, the mold is closed and the entire structure is impregnated with a thermosetting or thermoplastic epoxy resin. Thermosetting epoxy resin provides high strength and dielectric properties to the cartridge armature. Other construction materials may include polyamide-imide resin or cyanate-ester resin for improved high temperature resistance. Additional strength can be obtained by using thermoplastic resins, but at the expense of increased process complexity. A variety of resin fillers may also be used to control shrinkage while curing.

When the rotor rotates, torque develops on the windings across Z-coil active lengths 343 at area 205 and is at a maximum at area 207. Circumferential wraps of fiber reinforcement 419 and 421 provide radial and tangential strength on the inner and outer surfaces, respectively, of air-gap windings active sections 343. Disks of fiber reinforcement 418 and 423 at Z-coil outer end turns 342 at area 206 provide tangential continuity from Z-coil to Z-coil. Disks of fiber reinforcement 420, 422, 424, 425, 426, and 427, interleaved with electrical insulation material, are used at Z-coil inner end turn 341 at area 207 to provide strength to area 207.

Z-coil to Z-coil electrical insulation is provided by materials preferably having good resin absorption or bonding properties, such as, for example, DuPont Nomex® paper or etched Teflon®. Tangential spacers 435 are used between Z-coil active lengths 343 to provide coil separation. Insulation disk 428 is used between Z-coil outer end turns 342, while insulation disk 429 is used between inner end turns 341. Insulation disks 430, 431, 432, 433, and 434 are used among phase-bus connectors 414, 415, and 416, neutral-bus connector 417, and Z-coil inner end turn 341. When the cartridge armature is impregnated with resin, it is important that the insulation disks become an integral part of the encapsulated structure, otherwise delamination may occur which would compromise the strength.

Figure 6:
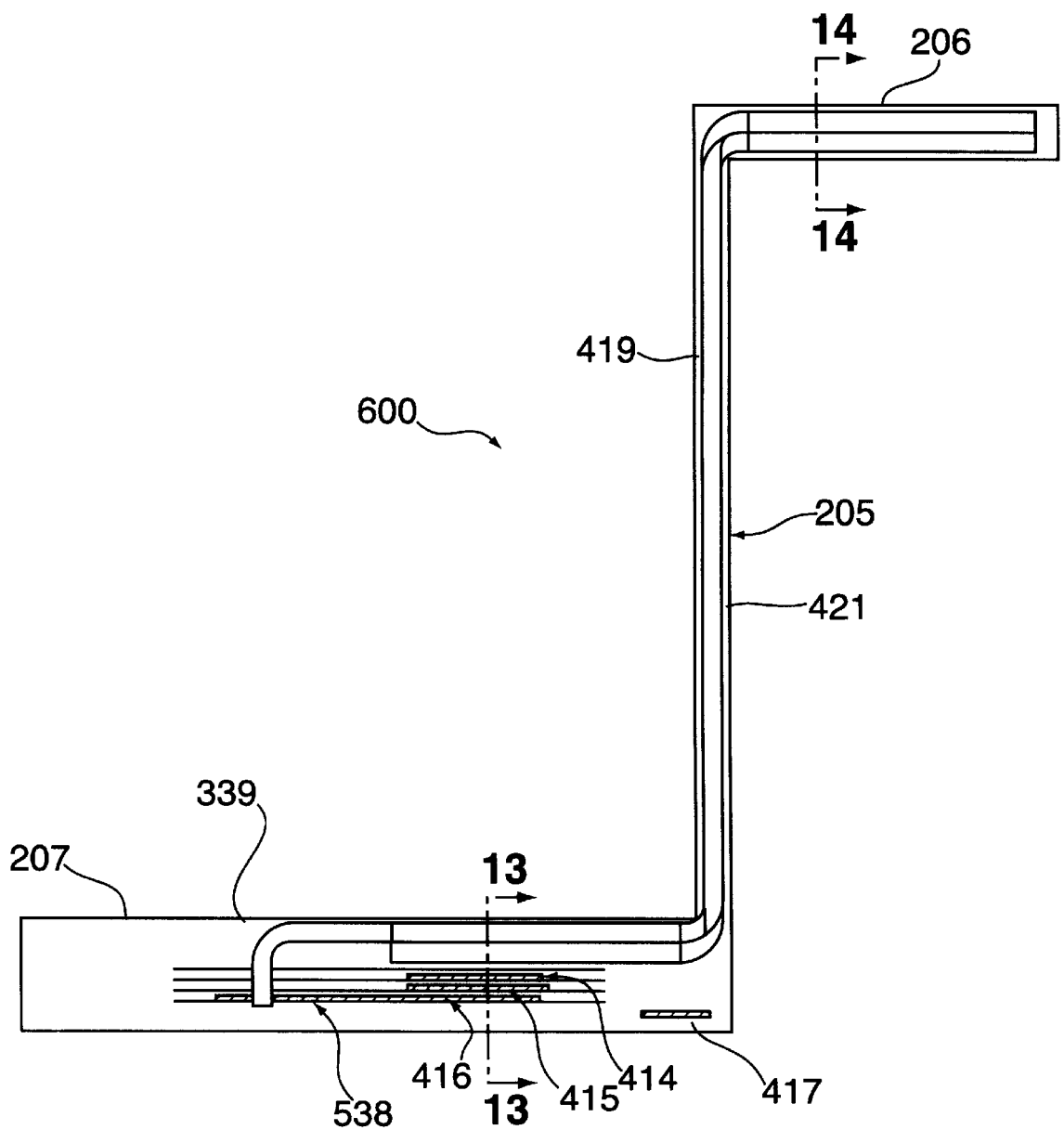
FIG. 6 is an exemplary cross-sectional view 6—6 of the cartidge armature of FIG. 2.

Electrical connection of Z-coil phase terminal 339 (FIG. 3) to phase-bus coil terminal tab 538 of phase-bus connector 416 (FIG. 5) is made by soldering. A detail of this connection is shown in FIG. 6. Other means of attachment, such as, for example, crimping or bolting, may also be used.

Figure 7:
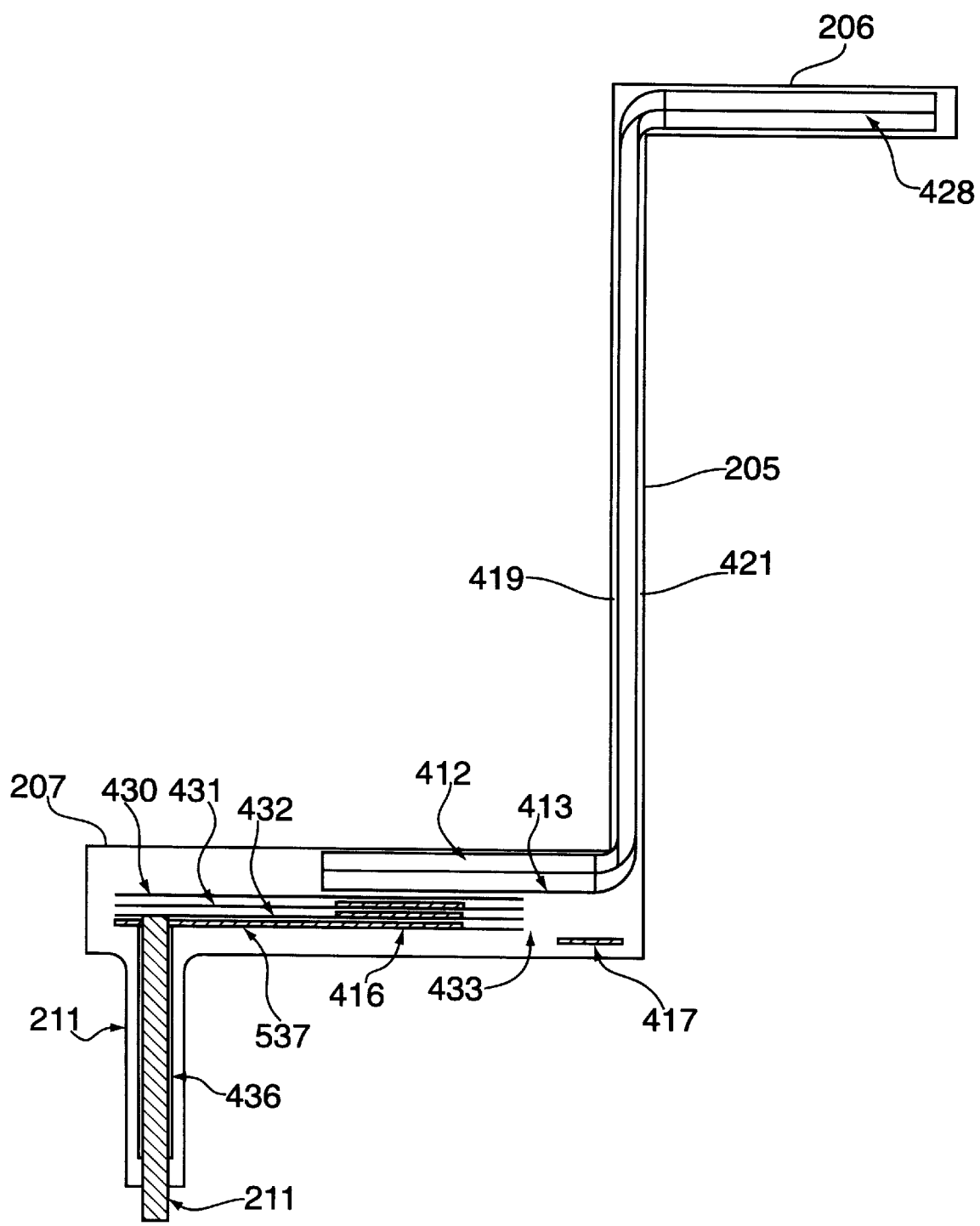
FIG. 7 is an exemplary cross-sectional view 7—7 of the cartridge armature of FIG. 2.
Figure 8:
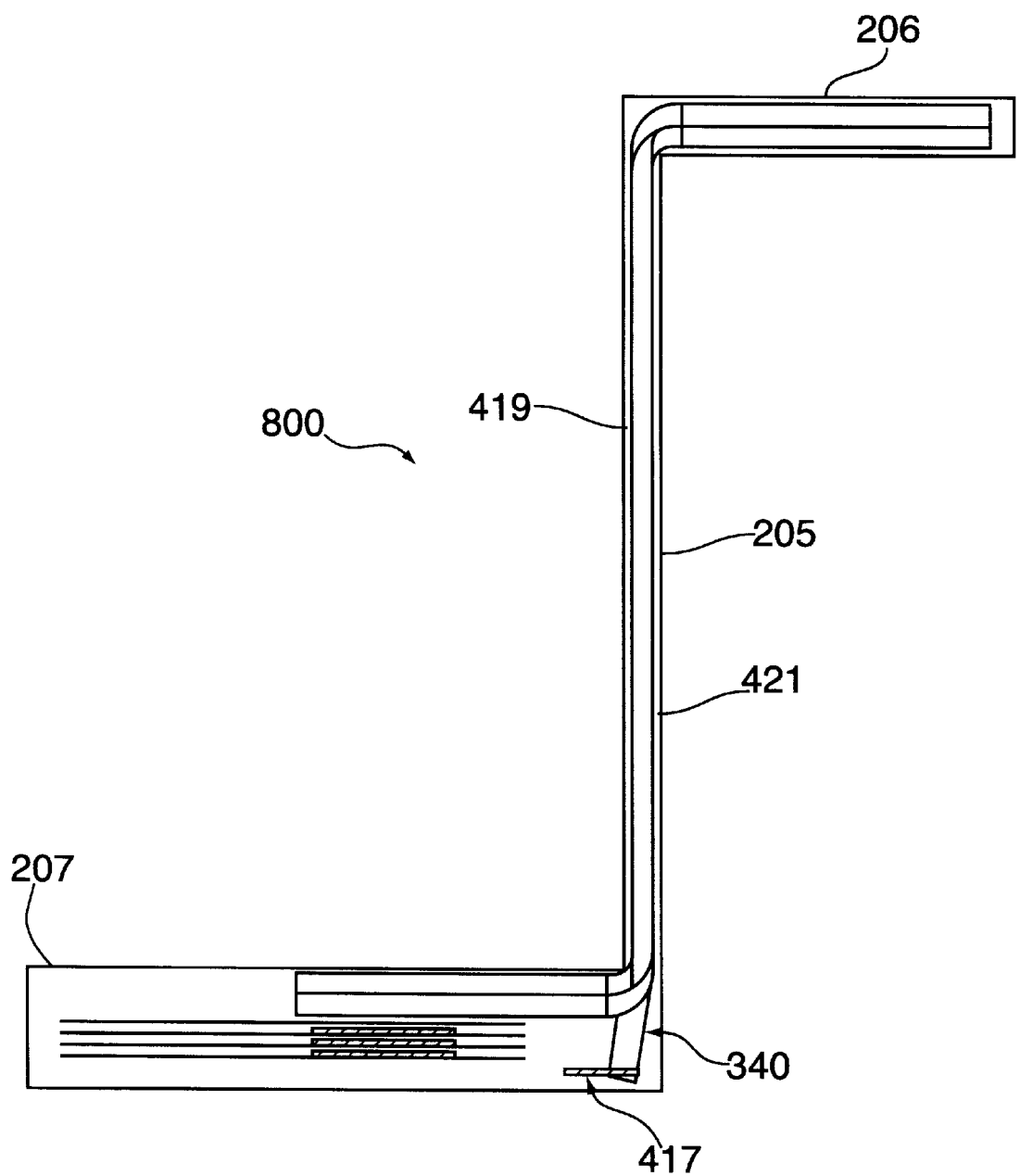
FIG. 8 is an exemplary cross-sectional view 8—8 of the cartridge armature of FIG. 2.

Three phase-bus connectors are used to configure a three-phase machine and are stacked as shown in FIG. 4, with separating layers of insulation and fiber reinforcement. FIG. 7 shows phase-bus connector 416 connected to output terminal 211, which is at a different azimuthal location than the connection of Z-coil phase terminal 339 to phase-bus connector 416, as shown in FIG. 6. This facilitates close packing of the conductors while maintaining effective electrical isolation distance. FIG. 8 shows Z-coil neutral terminal 340 attached to neutral-bus connector 417. Attachment can be, for example, by solder or mechanical means (e.g., screws). This connectivity between the Z-coil windings, phase-bus connectors 414, 415, and 416, and neutral bus 417 allows cartridge 200 to be configured as a three-phase, Y-connected circuit.

Figure 9:
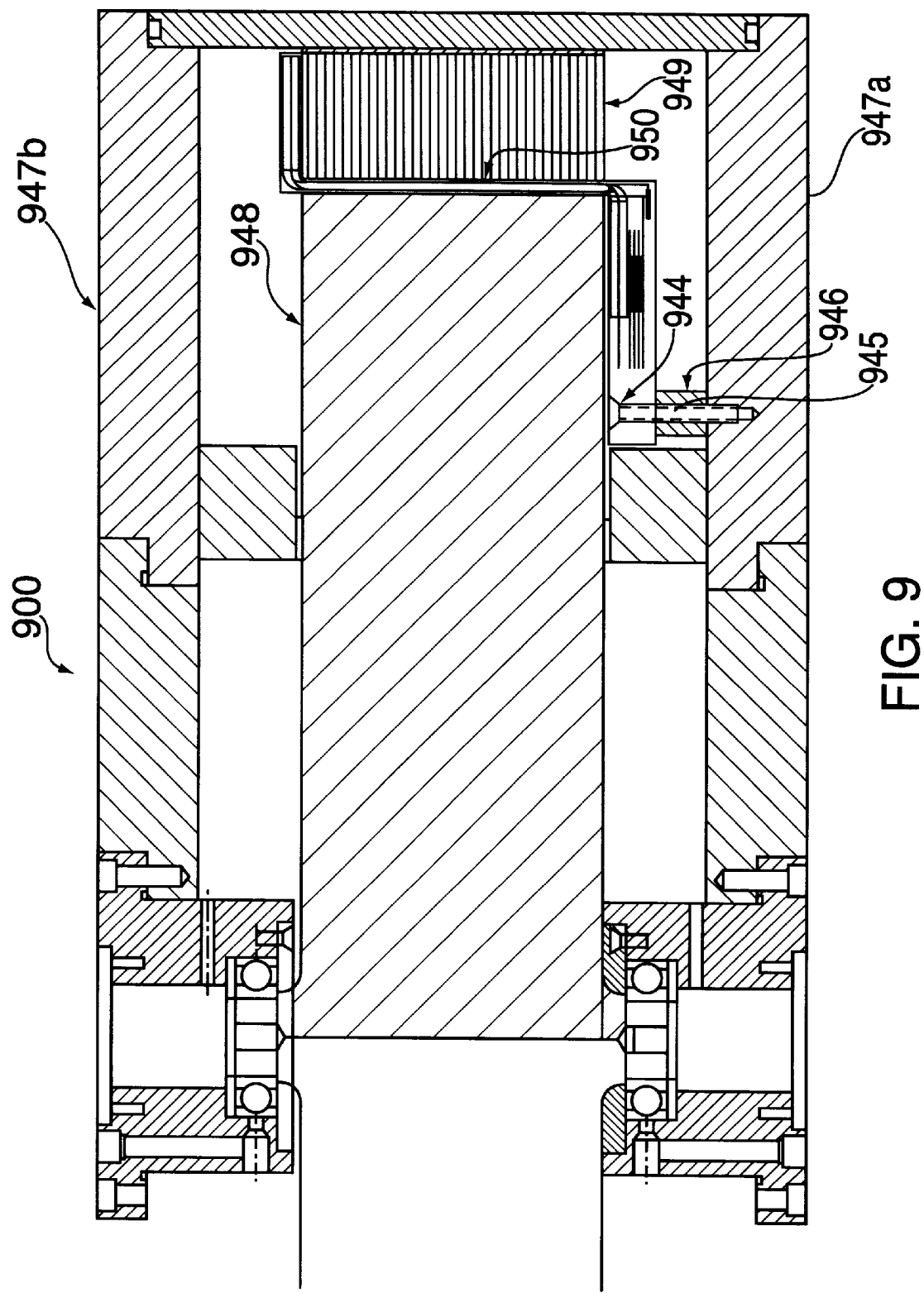
FIG. 9 is a cross-sectional view of the cartridge armature of FIG. 2 installed in a rotating electric machine, showing details of the fastener arrangement according to the present invention.
Figure 10:
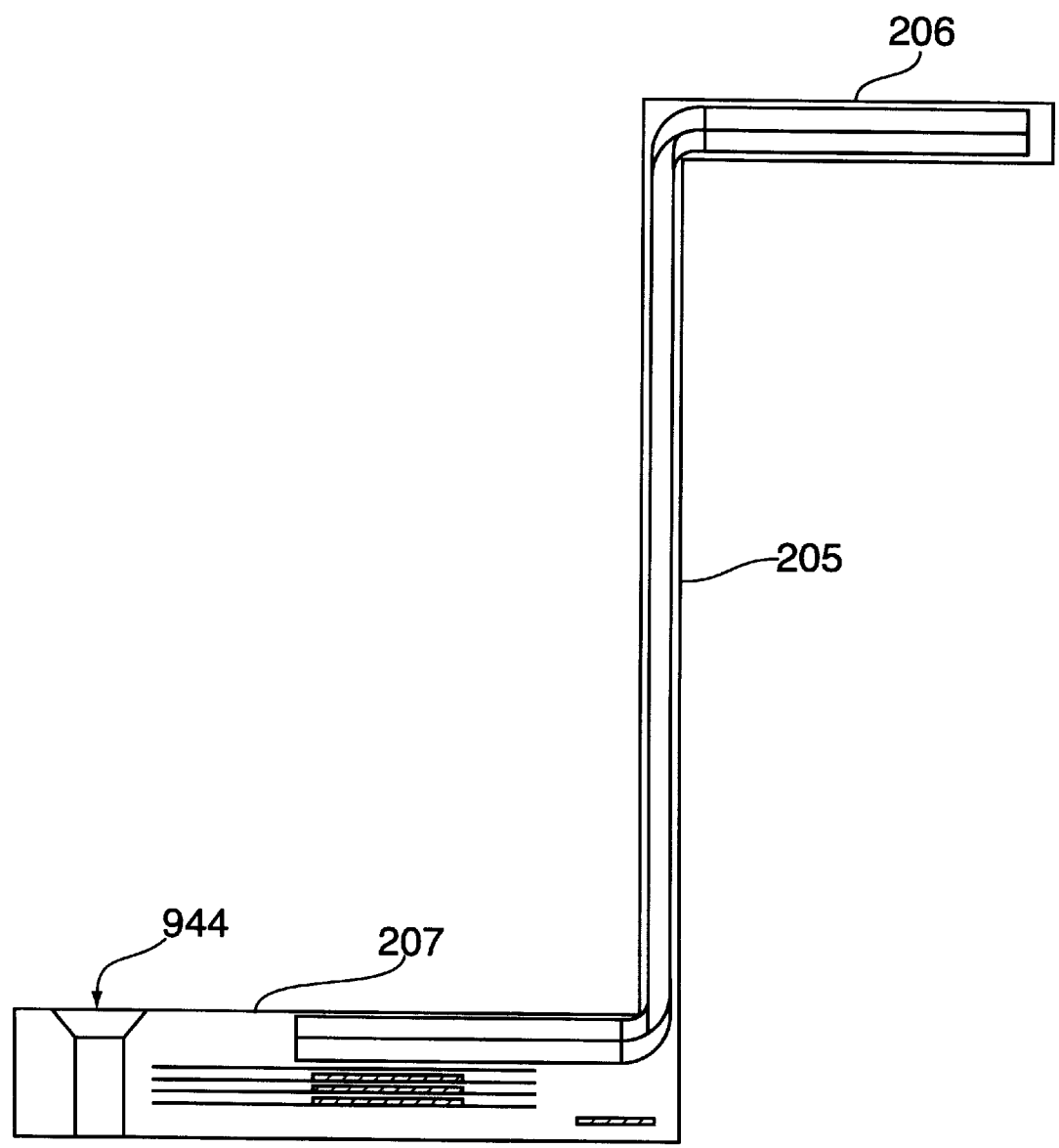
FIG. 10 is a cross-sectional view of the cartridge armature of FIG. 2 taken through a drilled and countersunk mounting screw hole.

FIG. 9 is a cross-sectional view of rotating electric machine 900 with cartridge 200 removably attached to it. Preferably, countersunk fasteners 945, inserted through drilled and countersunk holes 944 in cartridge 200, are used to attach cartridge 200 to machine 900. Spacer 946 provides the correct axial positioning relative to lower end plate 947*a*. With upper end plate 947*b* and rotor 948 removed from the machine, cartridge 200 is easily removed from machine 900 by simply unscrewing fasteners 945 and then lifting cartridge 200. This method of attachment advantageously permits torque transfer to the stator (which comprises all stationary parts of machine 900) and simplifies installation and removal, enhancing the field serviceability of machine 900.

To facilitate installation and removal of cartridge 200 in machine 900, an assembly clearance between stator lamination stack 949 and area 205 of cartridge 200 is provided. However, for heat conduction transfer to occur in a vacuum environment, thermal contact must be maintained. Thus, prior to installation, the mating surfaces of lamination stack 949 and area 205 are buttered with a film of thermal grease 950 (e.g., Dow 340) to fill the assembly clearance, thus permitting heat conduction transfer to occur from the armature conductors to the stator. Alternatively, thermal interface pads, such as those used to mount semiconductors to heat sinks (e.g., W.L. Gore Polarchip 7000) may also be used. Another alternative has the mating surfaces of the stator and cartridge armature slightly tapered to ease installation, provided that the machine bearings and other related components tolerate the accompanying load that is generated when the magnetic field of the rotor interacts with the magnetic field of the stator across the air-gap.

Figure 11:
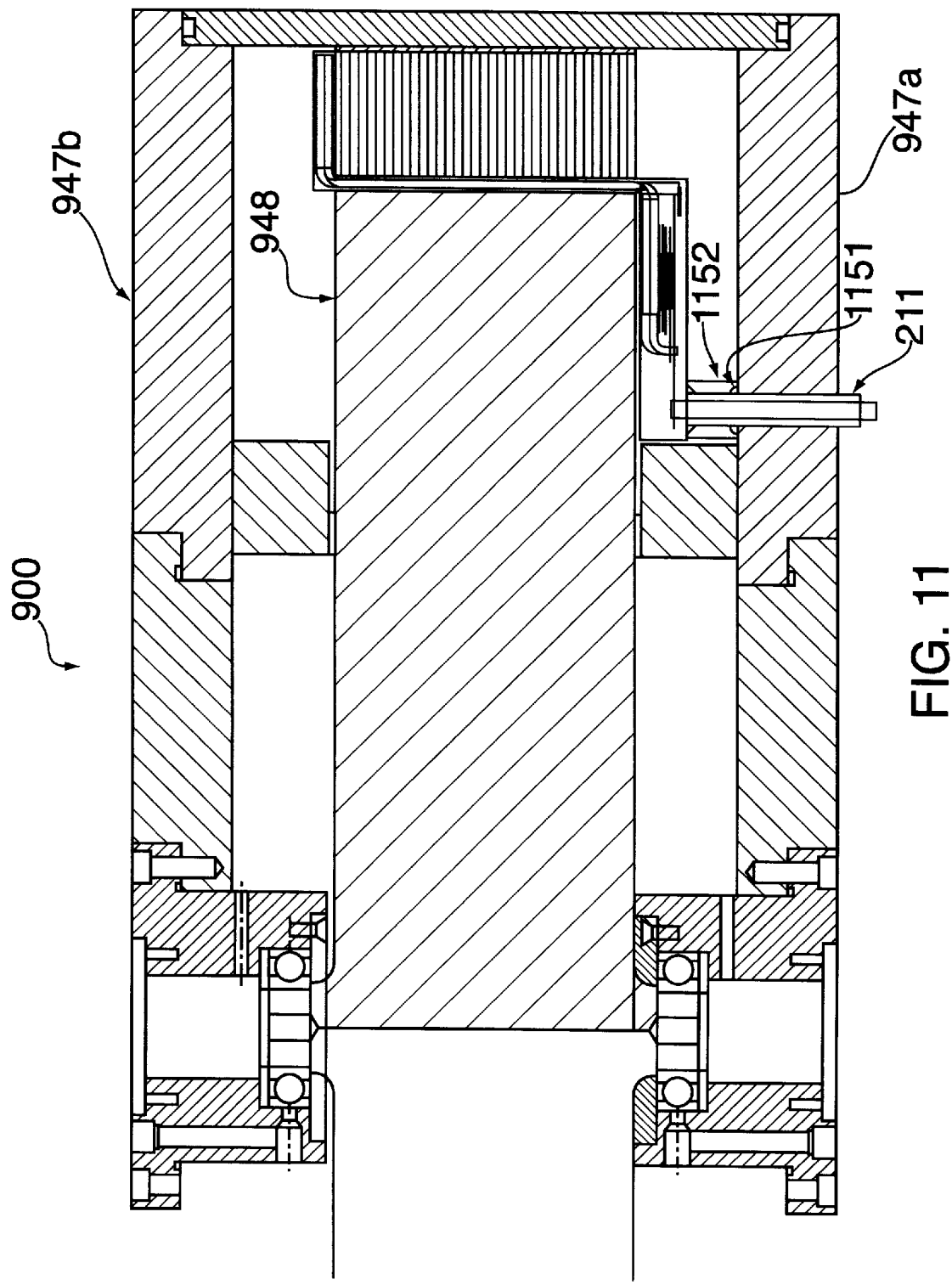
FIG. 11 is a cross-sectional view of the cartridge armature of FIG. 2 installed in a rotating electric machine, showing details of the vacuum tight terminal penetration of the stator.

For those rotating electric machines operating in a vacuum, penetration of the machine housing must have a good seal to minimize the size of the vacuum pump. Cartridge 200 advantageously provides this feature by completely encapsulating all components, including the output terminals, in the resin matrix, previously discussed. Referring to FIG. 11, the output terminals are made round and smooth during the resin encapsulation process such that a simple O-ring 1151 and O-ring compression bushing 1152 provide the necessary seal. Attachment of fasteners 945 provide the force necessary to compress O-ring 1151.

Equally important to both the electrical and mechanical integrity of cartridge 200 is the thorough degassing of the impregnating resin to reduce voids (i.e., areas that are void of epoxy resin because of gas bubbles). These voids act as capacitors that are subject to corona discharge. Voids are also locations of mechanical stress risers (i.e., locations of high stress) which can serve as crack initiation sites.

Figure 12:
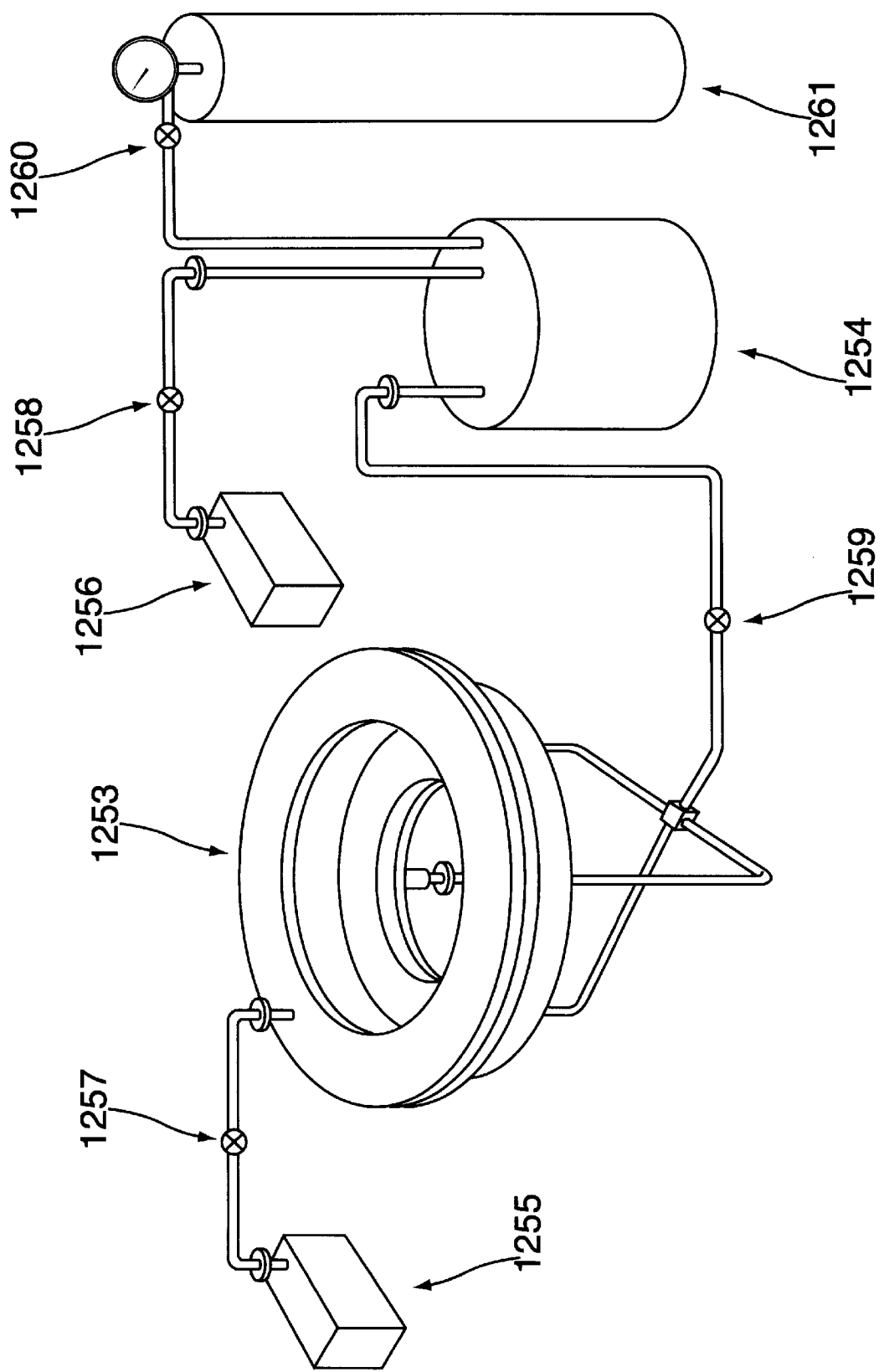
FIG. 12 is a simplified perspective view of an exemplary embodiment of apparatus for injection transfer molding of vacuum degassed epoxy resin impregnation of a cartridge armature device according to the present invention.
Figure 13:
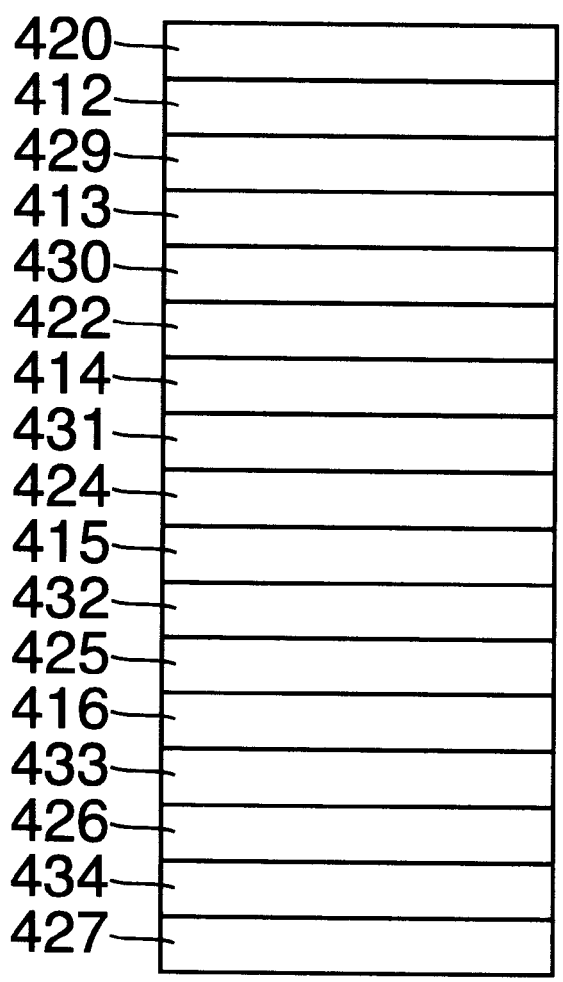
FIG. 13 is an exemplary cross-sectional view 13—13 of the cartridge armature of FIGS. 2 and 6.
Figure 14:
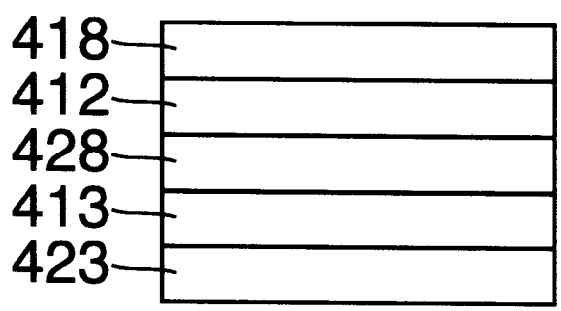
FIG. 14 is an exemplary cross-sectional view 14—14 of the cartridge armature of FIGS. 2 and 6.

Preferably, a resin transfer molding process of vacuum degassed epoxy resin is used in the fabrication process of cartridge 200. An exemplary embodiment of apparatus for implementing this resin transfer molding process is shown in FIG. 12. All components of cartridge 200 are first manually assembled in mold form 1253. Valve 1259 is closed to seal off mold form 1253 from the epoxy degassing tank 1254. Once the components are assembled, mold form 1253 is closed and vacuum from vacuum pump 1255 is applied to the assembled components to remove surface contamination such as moisture. This enhances the wetting and bonding of component surfaces. When mold form 1253 is sufficiently evacuated, an epoxy charge is mixed in degassing tank 1254 and then degassed under vacuum from vacuum pump 1256 for several minutes. Low heat is applied to degassing tank 1254 to reduce the viscosity of the epoxy. When thoroughly degassed, both mold vacuum valve 1257 and epoxy degassing vacuum valve 1258 are closed, and valve 1259, isolating mold form 1253 from degassing tank 1254, is opened. Epoxy resin is then forced into mold form 1253 by dry nitrogen from tank 1261, which is at a higher pressure than degassing tank 1254. Once filled, valve 1259 is closed and mold form 1253 is then heated (e.g., placed in an oven) to cure the epoxy. After the epoxy cures, cartridge 200 is removed from mold form 1253.

Thus it is seen that a field replaceable air-gap cartridge armature device is provided. One skilled in the art will appreciate that the present invention can be practiced by other than the described embodiments, which are presented for purposes of illustration and not of limitation, and the present invention is limited only by the claims which follow.

What is claimed is:

1. A cartridge armature device for use in a rotating electric machine having a rotor that rotates about an axis and a stator having a ferromagnetic portion permanently affixed to said rotating electric machine, said cartridge armature comprising:

a plurality of air-gap win dings rigidly configured in a circular fashion, each of said air-gap windings having a pair of active members at a given diameter from said axis and first and second end turn sections attached to said active section, said first end turn sections forming at least a portion of an outer rim of said cartridge armature device and having an inner diameter substantially equal to said given diameter and an outer diameter that is larger than said given diameter, said second end turn sections forming at least a portion of an inner rim of said cartridge armature device and having an outer diameter substantially equal to said given diameter and an inner diameter that is smaller than said given diameter, said active members being embedded within an active section of said cartridge armature device;

a plurality of phase-bus connectors coupled to said plurality of air-gap windings, said plurality of air-gap windings and said plurality of phase-bus connectors being embedded in a fiber reinforced epoxy resin matrix, said matrix producing said rigid configuration of air-gap windings for transferring torque from said air-gap windings to the stator of a rotating electric machine; and a plurality of output terminals coupled to said plurality of phase-bus connectors, said cartridge armature device being removably attachable to said rotating electric machine such that said plurality of windings may be removed as an independent unit.

2. The cartridge armature of claim 1, wherein said first and second end turn sections are bent in opposite directions from said active section.

3. The cartridge armature of claim 2, wherein said first and second end turn sections are bent such that they are substantially parallel to each other.

4. The cartridge armature of claim 2, wherein said first and second end turn sections are bent such that they are substantially perpendicular to said active section.

5. The cartridge armature of claim 1 further comprising a plurality of circumferential wraps of fiber reinforcement attached to said active section to provide radial and tangential strength to said cartridge armature.

6. The cartridge armature of claim 1 further comprising a plurality of disks of fiber reinforcement positioned at said outer rim to provide tangential continuity from air-gap winding to air-gap winding.

7. The cartridge armature of claim 1 further comprising disks of fiber reinforcement interleaved with electrical insulation material positioned at said inner rim to provide strength to said cartridge armature.

8. The cartridge armature of claim 1 wherein each of said plurality of phase-bus connectors is coupled to a respective one of said plurality of output terminals.

9. The cartridge armature of claim 8 further comprising an insulation disk positioned between two said phase-bus connectors.

10. The cartridge armature of claim 1 wherein said plurality of air-gap windings is encapsulated to reduce the risk of corona discharge in a low pressure environment.

11. The cartridge armature of claim 1 further comprising countersunk fasteners for removable attachment to a rotating electric machine.

12. The cartridge armature of claim 1 wherein said plurality of air-gap windings are configured as a three-phase, Y-connected circuit.

13. The cartridge armature of claim 1 further comprising a tangential spacer positioned between at least two adjacent air-gap windings of said plurality of air-gap windings to provide air-gap winding separation.

14. The cartridge armature of claim 1 wherein said output terminals are round and smooth to provide sealed penetration of a rotating electric machine for providing electrical feed-throughs from said cartridge armature.

* * * * *

UNITED STATES PATENT AND TRADEMARK OFFICE
CERTIFICATE OF CORRECTION

| | |
|---|---|
| PATENT NO. | : 6,208,056 B1 |
| DATED | : March 27, 2001 |
| INVENTOR(S) | : David E. Perkins |

It is certified that error appears in the above-identified patent and that said Letters Patent is hereby corrected as shown below:

Title page,
References Cited, change "Blohn" to -- Blohm --;

Column 7,
Line 60, change "win dings" to -- windings --.

Signed and Sealed this

Thirtieth Day of April, 2002

Attest:

JAMES E. ROGAN
*Attesting Officer*    *Director of the United States Patent and Trademark Office*